Jan. 9, 1940.  H. REINWALD  2,186,429
CUBE STEAK CUTTER AND FLATTENER
Filed Dec. 10, 1938
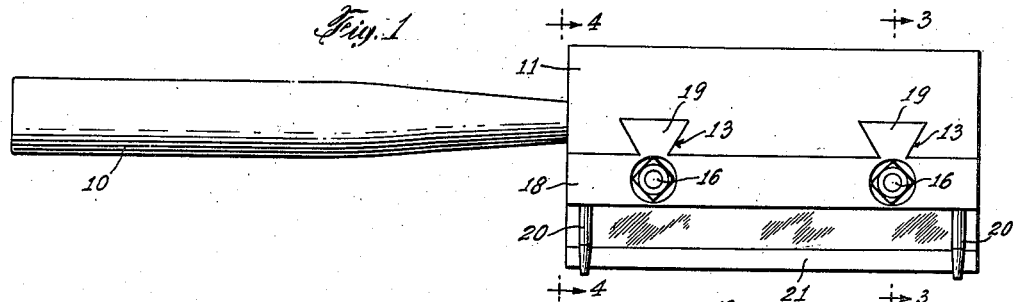
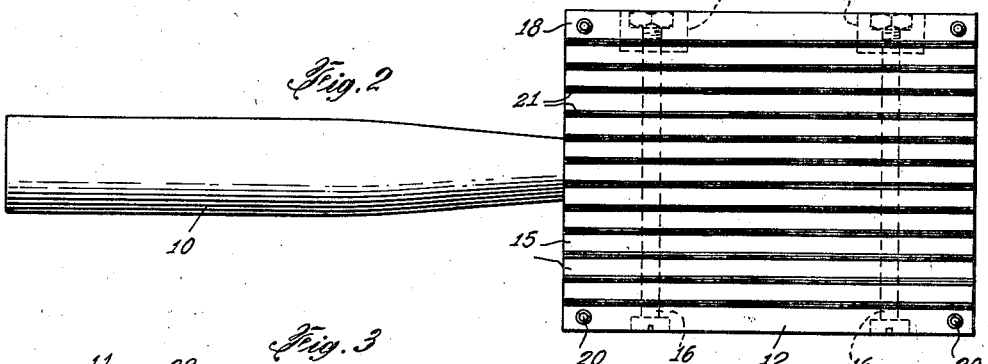
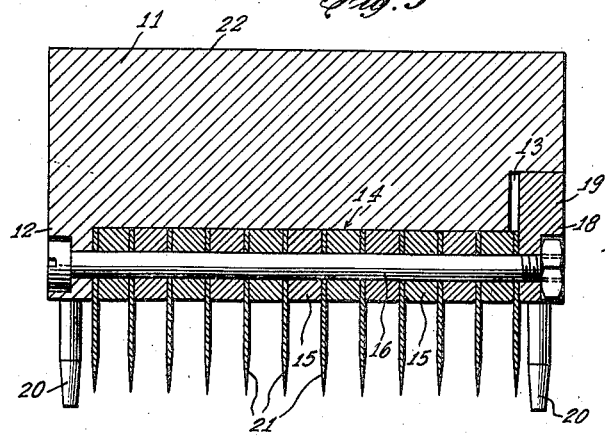
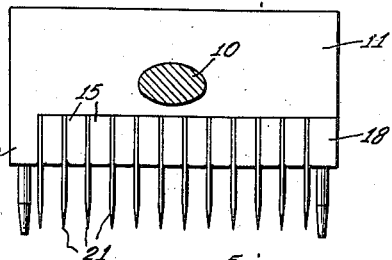
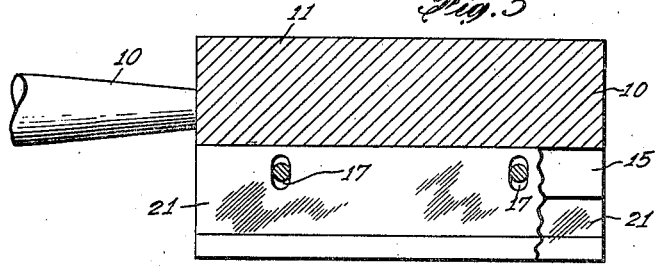
INVENTOR.
H. REINWALD.
BY J. Ledermann
ATTORNEY.

Patented Jan. 9, 1940

2,186,429

UNITED STATES PATENT OFFICE 2,186,429

CUBE STEAK CUTTER AND FLATTENER

Hans Reinwald, New York, N. Y.

Application December 10, 1938, Serial No. 244,890

2 Claims. (Cl. 30—304)

This invention relates to so-called cube steak cutters, and has for its object the provision of such a device in the nature of a tool adapted for hand use, which is at the same time efficient in operation and economical in cost of construction.

The device may also be used to flatten steaks or the like by utilizing the reverse side thereof and striking the meat therewith.

The above and other objects will become apparent in the description below, in which characters of reference refer to like-named parts in the accompanying drawing.

Referring briefly to the drawing, Figure 1 is a side elevational view of the device.

Figure 2 is a bottom plan view thereof.

Figure 3 is a cross-sectional view taken on the line 3—3 of Figure 1.

Figure 4 is a cross-sectional view taken on the line 4—4 of Figure 1.

Figure 5 is a cross-sectional view taken on the line 5—5 of Figure 4.

Referring in detail to the drawing, the numeral 10 represents the handle of the device, which is inserted into a head or block 11. A wall 12 projects downward from one side of the block 10. On the opposite side of the block 11, a pair of spaced-apart swallow tail recesses 13 are cut out of the side wall of the block.

In assembling the device, it is set on a table in a position the obverse of that illustrated, with the top flat surface 22 of the block 10 resting on the table. A plurality of spacer members 15 are each provided with a pair of openings therethrough, through which screw bolts 16 are adapted to pass. A plurality of knife blades 21 are mounted in spaced-apart relationship against the surface 14 by utilizing the members 15 as spacers, the knife blades also having pairs of openings 17 passing therethrough. The openings through the members 15 and the openings 17 through the blades, are both elongated vertically, as shown at 17.

A pair of similarly spaced apart openings are provided through the wall 12, and this wall serves, as will hereinafter become apparent, as one jaw of a clamp. The second jaw of the clamp is provided by the member 18, which is removably mounted on the opposite end of the surface 14 and is provided with projections 19 of similar conformation to the recesses 13; the projections 19 are adapted to register slidably in the latter. The member 18 is also provided with a similar pair of aligned holes.

Each of the jaws of the clamp, that is, the wall 12 and the member 18, has at each end a peg 20 of wood or other suitable material, which extends downward to a slightly greater distance than the blades 21.

The blades 21 are clamped in spaced apart position, as shown, by means of the jaws 12 and 18, with the bolts 16 passing through the blades, the spacer members, and the jaws of the clamp. The outer sides of the openings through the wall 12 and the jaw 18 are both countersunk so that the heads of the bolts and the nuts may lie flush with the outer surfaces of these members.

The normally top surface 22 of the block 10 is flat, and the device may be used as a steak or meat flattener by striking the meat with this flat surface. To use the device as a cube steak cutter, the blades are first applied to the steak and the surface of the steak cut for a depth with a series of parallel cuts, and then the same cuts are again made at right angles to the first series. The steak is then turned over and the other surface is likewise cut into cubes. The pegs 20 serve to support the blades above the table surface when the device is set down with the blades against the table. The blades may be removed for sharpening, cleaning or replacing in an obvious manner.

Obviously, modifications in form and structure may be made without departing from the spirit and scope of the invention.

I claim:

1. A device of the class described comprising a block having a handle thereon, the top and bottom surfaces of said block being flat, one side wall of said block being extended downward to provide a stationary clamp jaw, the opposite side wall of said block having recesses therein, a movable clamp jaw slidably mounted on said bottom surface and having upwardly extending projections registering slidably in said recesses, a plurality of blades and a plurality of spacer members mounted between said clamp jaws and against said bottom surface, bolts extending through said jaws, said blades, and said spacer members and adapted to be tightened to lock said blades in spaced apart relation on said block.

2. A device of the class described comprising a block having a handle thereon, the top and bottom surfaces of said block being flat, one side of said block being extended downward to provide a stationary clamp jaw, the opposite side wall of said block having recesses therein, a movable clamp jaw slidably mounted on said bottom surface and having upwardly extending projections registering slidably in said recess, a plurality of blades and a plurality of spacer members mounted between said clamp jaws and against said bottom surface, bolts extending through said jaws, said blades, and said spacer members and adapted to be tightened to lock said blades in spaced apart relation on said block, said wall recesses and said upwardly extending projections being of substantially swallow tail conformation with the sides of the tail extending divergently upward.

HANS REINWALD.